United States Patent
Sornin et al.

(10) Patent No.: US 8,379,770 B2
(45) Date of Patent: Feb. 19, 2013

(54) SIGNAL CONVERSION SYSTEM FOR SENDING OR RECEIVING A RADIOFREQUENCY SIGNAL

(75) Inventors: Nicolas Sornin, La Tronche (FR); Laurent Perraud, Acton, MA (US)

(73) Assignee: Nanoscale Labs, Rousset (FR)

( * ) Notice: Subject to any disclaimer, the term of this patent is extended or adjusted under 35 U.S.C. 154(b) by 313 days.

(21) Appl. No.: 12/744,144

(22) PCT Filed: Nov. 21, 2008

(86) PCT No.: PCT/EP2008/065955
§ 371 (c)(1),
(2), (4) Date: May 21, 2010

(87) PCT Pub. No.: WO2009/065916
PCT Pub. Date: May 28, 2009

(65) Prior Publication Data
US 2010/0264978 A1 Oct. 21, 2010

(30) Foreign Application Priority Data

Nov. 23, 2007 (FR) ..................................... 07 59260

(51) Int. Cl.
*H04L 27/06* (2006.01)
(52) U.S. Cl. ........ 375/340; 375/278; 375/284; 375/285; 375/316; 375/346
(58) Field of Classification Search .................. 375/340, 375/278, 284, 285, 316, 346
See application file for complete search history.

(56) References Cited

U.S. PATENT DOCUMENTS

| | | | |
|---|---|---|---|
| 6,298,277 B1 | 10/2001 | Videcoq | |
| 6,463,266 B1 | 10/2002 | Shohara | |
| 6,700,516 B1 * | 3/2004 | MacDonald | ................. 341/122 |
| 2006/0064260 A1 * | 3/2006 | Stein et al. | ..................... 702/76 |

OTHER PUBLICATIONS

International Search Report dated Feb. 11, 2009, from corresponding PCT application.

* cited by examiner

*Primary Examiner* — Sam K Ahn
*Assistant Examiner* — Leila Malek
(74) *Attorney, Agent, or Firm* — Young & Thompson

(57) ABSTRACT

System for converting a radiofrequency signal $S_{RX}$ so as to recover encoded information carried by the signal $S_{RX}$, includes generating elements arranged to generate a signal $S_{LO}$, mixing elements (3) arranged to generate a signal $S_{RX-LO}$ by mixing the signal $S_{RX}$ with the signal $S_{LO}$, an analog/digital converter arranged to convert the signal $S_{RXLO}$ into a digital signal $S_{RX-LO-Num}$, a device generating an error correction digital signal $S_{Cor}$, the device being arranged so that the signal $S_{Cor}$ reflects the phase gap between the phase of the signal $S_{LO}$ and a phase setpoint, the phase setpoint being the phase of an ideal signal $S_0$, ideal for recovering the encoded information carried by the signal $S_{RX}$, combining elements arranged to generate the signal $S_{0'-Num}$ by combining the signal $S_{RX-LO-Num}$ with the signal $S_{Cor}$. A system for converting a digital signal so as to send a radiofrequency analog signal carrying the information of the digital signal is also described.

19 Claims, 2 Drawing Sheets

SIGNAL CONVERSION SYSTEM FOR SENDING OR RECEIVING A RADIOFREQUENCY SIGNAL

The present invention concerns a system for converting a radiofrequency signal. More especially, the invention refers to a system for converting a radiofrequency signal so as to recover encoded information carried by an analog signal and/or allow emission of a radiofrequency analog signal carrying the information of a digital signal.

The invention is intended for multiple applications involving radiofrequency communication. It has proved to be particularly advantageous for example for general public applications in the field of wireless communications. In general, it will apply to all types of applications requiring frequency synthesis in order to receive or emit an encoded signal on a carrier.

BACKGROUND OF THE INVENTION

It is known that a radiofrequency signal is synthesized by a frequency synthesizer the purpose which is to generate a sinusoidal signal $S_{LO}$ When the system is in reception mode, this sinusoidal signal $S_{LO}$ will combine with a received analog signal to allow recovery of encoded information carried by the latter.

When the system is in emission mode, this sinusoidal signal $S_{LO}$ will combine with an analog signal generated by a digital signal containing the said information.

Depending on the field of application of a system for converting a radiofrequency signal, the design of the latter will require that all or part of the following criteria are met:

Purity: the purity or spectral purity characterizes the quality of signal $S_{LO}$ generated by the frequency synthesizer. The more the signal $S_{LO}$ contains signals for conversion other than the ideal sinusoidal signal $S_0$ (harmonics or different tone signals), the more the performances of the conversion system will be degraded.

Phase noise: the phase noise characterizes the random gap between the signal phase $S_{LO}$ actually generated by the frequency synthesizer and the ideal sinusoidal signal phase $S_0$ for conversion.

The cost: the cost of a radiofrequency signal conversion system is closely related to the surface of silicon that it occupies. Therefore, this occupied surface will have to be minimized in order to reduce the cost of the radiofrequency signal conversion system.

In order to generate a sinusoidal signal $S_{LO}$, several types radiofrequency signal synthesizing systems have been proposed. These types of synthesizing system use frequency synthesizers that can be grouped into two main families: analog frequency synthesizers with phase-locked loop generally designated by PLL and all digital phase-locked loop synthesizers generally designated by their acronym ADPLL.

A conventional PLL-type frequency synthesizer consists of a voltage controlled oscillator, usually designated by VCO the role of which is to generate a sinusoidal signal $S_{LO}$. It also includes a high frequency divider that can divide the frequency of signal $S_{LO}$ by a factor N. A phase comparator determines the gap between the signal phase at the divider output and the phase of a reference signal with known and stable frequency. This reference signal $S_{Ref}$ is usually generated by a crystal oscillator or quartz oscillator. The phase comparator generates a signal $V_{ctrl}$ that reflects the said phase gap. Signal $V_{ctrl}$ is then filtered by a low-pass filter before being injected into the VCO. Thus the loop converges so that the frequency generated by the VCO approaches the reference signal frequency $S_{Ref}$ multiplied by N.

All the frequencies that can be obtained with this type of PLL at the VCO output consist of all the reference signal $S_{Ref}$ frequencies multiplied by N. Therefore, a reference signal with a frequency equal to the gap between the channels to be used (generally a few KHz to a few MHz) should be used.

To circumvent this constraint concerning the reference frequencies, PLL-type frequency synthesizers have been proposed with a frequency divider whose division ratio can be modulated on a few values centered on the main division ratio N. The frequencies that can be attained are no longer limited to the reference signal frequencies $S_{Ref}$ multiplied by N.

However, such a frequency divider tends to generate a noise, which involves a limitation on the PLL bandwidth. This noise can only be reduced by substantial energy overconsumption by the divider.

A digital frequency synthesizer ADPLL consists of a VCO whose output is converted into a digital signal by an analog/digital converter. The ADPLL also includes a frequency digital divider, a digital phase comparator, a digital low-pass filter and digital/analog converter arranged successively from the analog/digital converter output to the VCO in order to create a digital loop. The digital divider divides the digital signal frequency generated by the analog/digital converter. The digital phase comparator determines the gap between the signal phase at the divider output and a reference signal phase and generates a digital signal $V_{ctrl}$ reflecting the said phase gap.

Signal $V_{ctrl}$ is then filtered by the digital low-pass filter before being converted into an analog signal by the digital/analog converter. The analog signal is then injected into the VCO.

In other types of ADPLLs, digital signal $V_{ctrl}$ from a digital phase converter and a digital low-pass filter modulate a digitally controlled oscillator. This type of oscillator is generally designated by its acronym DCO (Digitally Controlled Oscillator). Its input is a digital signal. Advantageously, the ADPLL provides for both a VCO and a DCO.

In known ADPLLs, the phase comparator usually generates significant noises and these are constraining for the filter bandwidth. Known ADPLLs require a compromise between purity and agility, the agility being closely related to the width of the filter bandwidth. Moreover, known ADPLLs cannot generate high frequencies typically above 3 GHz. It results from these constraints that the use of known ADPLLs is today limited to a few very specific applications.

Moreover, the quality of the digital/analog converter directly affects the VCO input signal. In fact, the performances of known digital/analog converters cannot generate a signal that is sufficiently accurate to obtain a satisfactory level of purity at the frequency synthesizer output.

In addition, the use of a DCO considerably limits the accuracy of modulation in the ADPLL type frequency synthesizers.

SUMMARY OF THE INVENTION

The purpose of the present invention is to limit at least one of the shortcomings associated with each of the above-mentioned signal conversion systems. In particular, for the same level of performance, a conversion system according to the invention has a production cost that is notably less than that of a known conversion system.

Moreover, the invention will improve the purity and/or the agility of the known conversion systems without increasing the production cost.

To achieve this aim, the invention describes a system for converting a received radiofrequency signal $S_{RX}$ so as to recover the encoded information carried by signal $S_{RX}$, including:

generating means arranged so as to generate a signal $S_{LO}$ mixing means arranged so as to generate a signal $S_{RX-LO}$ by mixing signal $S_{RX}$ with signal $S_{LO}$, an analog/digital converter arranges so as to convert signal $S_{RXLO}$ into digital signal $S_{RX-LO-Num}$, a device generating an error correction digital signal $S_{Cor}$, the device being arranged so that signal $S_{Cor}$ reflects the phase gap between the phase of signal $S_{LO}$ and a setpoint phase, the setpoint phase being the phase of an ideal signal $S_0$, ideal in order to recover the encoded information carried by signal $S_{RX}$, combination means arranged to generate signal $S_{0'-Num}$ by combining signal $S_{RX-LO-Num}$ with signal $S_{Cor}$.

Hence, the conversion system according to the invention generates a signal $S_{0'-Num}$ that is identical or very similar to a combination of the ideal signal $S_0$ and signal $S_{RX}$ received and carrying the information to be recovered.

The error correction signal $S_{Cor}$ reflecting the phase gap between ideal signal $S_0$ and signal $S_{LO}$ generated by the generation means is not applied at the input of the latter, as is the case with known frequencies synthesizers. The invention provides for no retro-action on the generation means themselves but ensures a direct action type correction at the level of the signal received by the system and mixed with the signal generated by the generation means.

This particular architecture of the frequency synthesizer offers many advantages.

It allows free oscillation of the generation means. Consequently, the invention makes it possible to eliminate an analog filter at the generation means input. In conventional synthesizers with phase locking loop, it is essential to have this type of filter at the oscillator input. In fact, this analog filter uses a substantial silicon surface relative to the entire silicon surface occupied by the frequency synthesizer. Consequently, eliminating this analog filter substantially reduces the occupied silicon surface and leads to a very substantial reduction of the synthesizer cost.

Moreover, the applicant has noted that the filter makes a substantial contribution to the phase noise generated.

In addition, the applicant has observed that in the conversion systems equipped with a PLL the VCO generate harmonics with frequencies multiples of the frequency of the reference signal $S_{Ref}$. In fact, the invention does not provide for automatic control at the generation means. Therefore the latter do not receive a reference signal input and therefore do not generate the harmonics caused by such a signal.

Moreover, the applicant has observed that in the PLL, the phase noise generated by the reference and the noise introduced by the phase comparator are multiplied by a factor N at the VCO output. The result is a noise multiplied by N at the level of the signal recovered at the conversion system output.

In fact, the invention does not use a frequency divider at the generation means input. Therefore it does not multiply the part of the reference phase noise or the phase comparator by N at the generation means. Compared to known conversion systems with PLL, the conversion system according to the invention can withstand a higher noise level on reference signal $S_{Ref}$. Therefore, for conversion systems with identical performances, the invention makes possible the use of a reference with lower performance and therefore less cost than the existing conversion systems.

Moreover, the invention also covers a system for converting a digital signal $S_{TX-Num}$ in order to emit a radiofrequency analog signal $S_{TX}$ carrying the signal $S_{TX-Num}$, information, including:

generating means arranged so as to generate a signal $S_{LO}$ a device generating an error correction for digital signal $S_{Cor}$, the device being arranged so that signal $S_{Cor}$ reflects the phase gap between the phase of signal $S_{LO}$ and a phase setpoint, the phase setpoint being the phase of an ideal signal $S_0$, ideal so as to transpose signal $S_{TX-Num}$ at a frequency required with a view to its emission, combination means arranges to generate signal $S_{TX-Cor-Num}$ by combining signal $S_{TX-Num}$ with signal $S_{Cor}$.

a digital/analog converter arranged to convert digital signal $S_{TX-Cor-Num}$ into an analog signal $S_{TX-Cor}$, mixing means arranged to generate a signal $S_{TX}$ by mixing signal $S_{TX-Cor}$ with signal $S_{LO}$.

Thus, the conversion system according to the invention makes it possible to generate a signal $S_{TX}$ identical or very similar to a combination of ideal signal $S_0$ and signal $S_{TX-Num}$ carrying the information to be emitted.

When in emission, this conversion system applies the same principles and offers the same advantages as the conversion system in reception mode described previously.

Indeed, whether intended to work in reception mode or emission mode, a conversion system according to the invention has no retro-action on the generation means themselves and consists of a device arranged so as to make a direct action type correction at the level of the signal carrying the information to be received or emitted.

A conversion system according to the invention destined to operate either in reception or emission mode could moreover present at least optionally any one of the following characteristics:

it includes the means for generating a reference signal $S_{Ref}$, the sampling means input being signal $S_{LO}$ and signal $S_{Ref}$ arranged to generate a digital signal $S_{LO-Num}$, digital representation of signal $S_{LO}$, the sampling means include a phase sampler and, insofar as signal $S_{LO-Num}$, is a digital representation of the phase of signal $S_{LO}$, the device includes at least one input arranged to receive the characteristics of ideal signal $S_0$, at least one input arranged to receive digital signal $S_{LO-Num}$, means for calculating the instantaneous phase error between signal $S_{LO}$ and signal $S_0$, means for generating digital signal $S_{Cor}$ presenting a reverse phase of the said phase error, the device includes interface means arranged so as to vary the characteristics of ideal signal $S_0$, the device includes digital filtering means arranged to filter digital signal $S_{Cor}$, the device is arranged so that the digital filtering means include at least one filter with adjustable bandwidth, the device includes correction means arranged so as to correct sampling means imperfections.

In addition, the invention covers a system for converting a digital signal capable of receiving and emitting an analog radiofrequency signal with the characteristics of a conversion system operating in reception mode according to the invention and the characteristics of a conversion system operating in emission mode according to the invention.

The invention also covers a process for converting a received radiofrequency signal $S_{Rx}$ so as to recover the encoded information carried by signal $S_{RX}$, and comprising the following stages:

- a signal $S_{LO}$ is generated,
- a signal $S_{RX-LO}$ is generated by mixing signal $S_{RX}$ with signal $S_{LO}$,
- signal $S_{RX-LO}$ is converted into a digital signal $S_{RX-LO-Num}$,
- a digital error correction signal $S_{Cor}$ is generated to reflect the phase gap between signal $S_{LO}$ phase and the setpoint phase, the setpoint phase being an ideal signal $S_0$ phase, ideal for recovering the encoded information carried by signal $S_{RX}$,
- a signal $S_{0'-Num}$ is generated by combining signal $S_{RX-LO-Num}$ with signal $S_{Cor}$ To ensure that information generated by a digital signal $S_{TX-Num}$ is emitted, a process for converting digital signal $S_{TX-Num}$ into a radiofrequency analog signal $S_{TX}$ is covered by the invention. This process includes the following stages:

- a signal $S_{LO}$ is generated,
- a digital error correction signal $S_{Cor}$ is generated to reflect the phase gap between signal $S_{LO}$ phase and a setpoint phase, the setpoint phase being the phase of an ideal signal $S_0$, ideal for transposing signal $S_{TX-Num}$, at a frequency required for its emission,
- a digital signal $S_{TX-Cor-Num}$ is generated by combining signal $S_{TX-Num}$ with signal $S_{Cor}$,
- signal $S_{TX-Cor-Num}$ is converted into an analog signal $S_{TX-Cor}$,
- signal $S_{TX}$ is generated by mixing signal $S_{TX-Cor}$ with $S_{LO}$.

BRIEF DESCRIPTION OF THE DRAWINGS

Other characteristics, aims and advantages of the present invention will come to light on reading the following detailed description and taking into account the appended drawings given as non-exhaustive examples and on which.

DETAILED DESCRIPTION OF THE PREFERRED EMBODIMENTS

Figure 1:
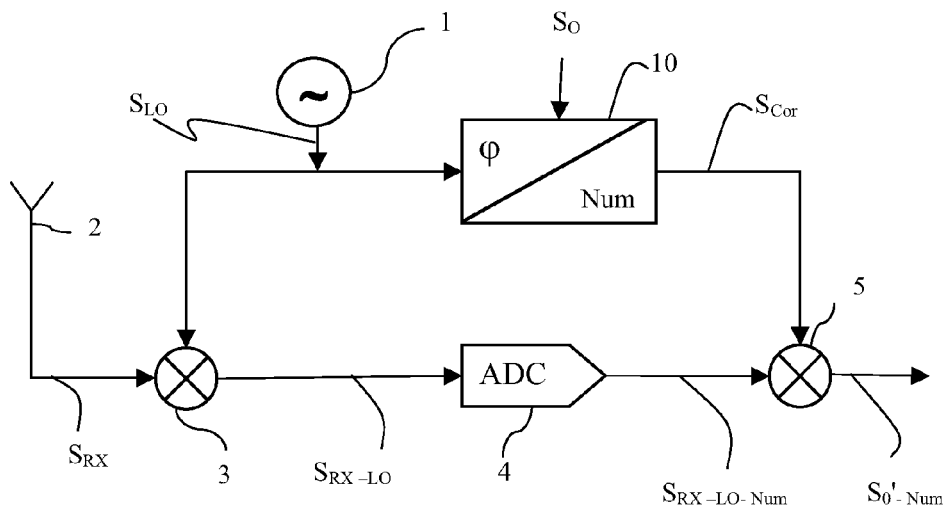
FIG. 1 is a simplified diagram of one example of the conversion system according to the invention designed to receive a radiofrequency signal.

A conversion system according to the invention operating in reception mode will now be described with reference to FIG. 1.

The signal comprises generation means 1 for generating the sinusoidal signal, radiofrequency signal reception means 2, means for mixing 3 two analog signals, means for converting 4 an analog signal into a digital signal, combination means 5 arranged so as to generate an output signal by combining two input signals and a device arranged to generate an error correction signal.

Generation means 1 include an oscillator. The latter may for instance be controlled by a digitally controlled oscillator (DCO) or a voltage controlled oscillator (VCO). These means 1 generate a sinusoidal signal $S_{LO}$, the designated frequency $F_{LO}$ of which may oscillate freely. In a preferred embodiment, this frequency $F_{LO}$ can be controlled at least approximately so as to oscillate freely within a frequency interval. This frequency interval can be centered around the required frequency. Advantageously, this control is carried out by a digital interface. Reception means 2 are arranged so as to receive a radiofrequency signal $S_{RX}$. They include all source types of radiofrequency signal to be demodulated. As a non-limiting example, these reception means may include an aerial. The conversion system is arranged so that the signal generated by the oscillator is mixed with signal $S_{Rx}$ emitted by the reception means. This mixing is carried out by mixing means 3. The latter may include a conventional mixer.

Mixing means 3 deliver an analog signal designated $S_{RX-LO}$. Signal $S_{Rx-LO}$ is converted into a digital signal $S_{RX-LO-Num}$ by analog/digital conversion means 4.

The conversion system is arranged so that signal $S_{LO}$ generated by the oscillator is also injected into device 10.

Device 10 includes the representation means delivering a digital representation of the phase $\phi_{LO}$ of signal $S_{LO}$. Advantageously, device 10 includes a reference 2 able to provide a reference signal $S_{Ref}$. This reference 2 may for instance include a crystal oscillator or quartz oscillator.

The representation means include the sampling means receiving an input signal $S_{LO}$ and signal $S_{Ref}$ and supplying a digital representation of the instantaneous phase for signal $S_{LO}$ on each rising edge of signal $S_{Ref}$.

Device 10 also receives a setpoint input. More precisely, the setpoint is a phase setpoint designated by which $\phi_o$. $\phi_o$ is the phase of an ideal signal, ideal for recovering encoded information and carried by signal $S_{RX}$. This device 10 includes calculation means arranged so as to calculate the phase gap between phase $\phi_{LO}$ of the signal $S_{LO}$ and phase $\phi_o$ of the signal $S_0$. Device 10 also includes the means for generating a digital error correction signal $S_{Cor}$, reflecting the said phase gap. More precisely, signal $S_{Cor}$ has a reverse phase at the calculated gap.

Communication means 5 receive digital signal $S_{Cor}$ and signal $S_{RX-LO\ Num}$ at the input and generate signal $S_{0'-Num}$ at the output. This signal $S_{0'-Num}$ is destined for subsequent processing in order to extract and use the information it contains using for example a modem.

Thus, the synthesizer according to the invention is able to generate a signal $S_{0'-Num}$ identical or very close to a combination of signal $S_0$ and signal $S_{RX}$ received and carrying the information recovered at the aerial. Signal $S_{Cor}$ reflecting the phase gap between ideal signal $S_0$ and signal $S_{LO}$ generated by the oscillator is not applied at the input of the latter as is the case with known frequently synthesizers.

The invention provides for no retro action on the oscillator itself but ensures a direct action type correction at the signal received by the mixing system and the signal generated by the oscillator.

By allowing the oscillator to oscillate freely, the intervention overcomes the need for an analog filter at the oscillator input. This also reduces notably the occupied surface of the silicon. Consequently, it brings very substantial reductions to the cost of making the conversion system.

Moreover, the applicant has identified that in the known conversion systems equipped with PLL, the voltage controlled oscillator generates harmonics with frequencies multiples of those of the reference signal $S_{Ref}$. In the known conversion systems, as the oscillator does not receive a reference signal at the input, it does not generate harmonics due to such a signal.

Moreover, the invention does not use a frequency divider at the oscillator input. Therefore it does not multiply the contribution of the reference phase noise or phase comparator by N at the oscillator output. Compared to known conversion systems integrating a PLL, the conversion system according to the invention can withstand a higher noise level on reference signal $S_{Ref}$. Thus, for the conversion systems with identical performances, the invention makes it possible to use a less effective and therefore less costly frequency reference compared to known conversion systems.

Moreover, a conversion system according to the invention and equipped with a reference identical to a conventional conversion system makes it possible to optimize freely the bandwidth and therefore offers significantly improved performances.

Advantageously, the device includes interface means arranged so as to vary the characteristics of the ideal signal $S_0$. Thus, by varying the phase $\phi_0$ of the ideal signal $S_0$, the conversion system is able to cover all the frequencies independently from frequency $F_{Ref}$ of reference signal $S_{Ref}$.

Moreover, the invention does not present any inconveniences resulting from known conversion system integrating a fractionary type PLL modulating the division ratio N. Indeed, the invention does not include the means for modulating division ratio N. In fact, the fractionary PLL of these modulating means generate considerable noise that substantially reduces their performances in terms of purity, energy consumption and bandwidth.

Advantageously, the system includes digital filtering means. These digital filtering means include at least one digital filter arranged so as to filter the signal $S_{Cor}$ before the latter is multiplied with signal $S_{RX-LO-Num}$.

Moreover and optionally, the digital means are arranged so that the filtering properties can be modified. In particular, it is proposed that the digital filter bandwidth is adjustable.

Thus, the filter bandwidth can be dynamically modified without disturbing the oscillator, contrary to existing conversion systems equipped with PLL. This enables device 10 to increase the bandwidth on a frequency change and then return to its optimum width in order to minimize the noise without this disturbing the conversion system. Controlled and rapid bandwidth settings enable the system to change frequency very quickly. The conversion system according to the invention show significantly improved agility compared to known conversion systems.

In a preferred embodiment, the device with correction means arranged to correct the imperfections of the sampling means. These correction means are used to correct digital representation $S_{LO-Num}$ of signal $S_{LO}$, before signal $S_{LO-Num}$ can be compared to the setpoint signal.

Moreover, in this invention, the bandwidth of the device is established freely by the digital filter applied to signal $S_{Cor}$. Thus, there is no constraint for the stability or spectral purity of the oscillator that would limit this bandwidth. The only limitation comes from the phase noise of the phase sampler and therefore only results in overall optimization of the phase noise in relation to the required application.

Moreover, the conversion system according to the invention requires no component or assembly of analog components that is not part of the architecture of a conventional conversion system equipped with a PLL, apart from the phase sampler which replaces the phase comparator in a PLL. In fact, when designing a conversion system for a given application, most of the development costs are involved in the design of the analog blocks. Adapting one application of the conversion system to another according to the invention essentially only requires modification of the characteristics enabling the correction signal $S_{Cor}$ to be generated. This type of modification is carried out in the digital field and does not involve substantial cost.

One conversion system according to the invention operating in emission mode will now be described with reference to FIG. 2.

The conversion system operating in emission mode comprises:
  generation means 1 generating a sinusoidal signal $S_{LO}$,
  means 23 for mixing the two analog signals,
  means 25 for combining the digital signals:
  means 24 for converting a digital signal into an analog signal
  means 22 for emitting an analog signal,
  device 10 arranged so as to generate an error correction signal $S_{Cor}$.

Signal $S_{LO}$, the frequency of which may oscillate freely and which is delivered by generation means 1 is injected into device 10. The latter is arranged so that error correction signal $S_{Cor}$ reflects the phase gap between signal $S_{LO}$ and an ideal signal $S_0$, the ideal signal $S_0$ being the ideal signal for transposing a signal to be emitted $S_{TX-Num}$ at a required frequency with a view to its emission.

Signal $S_{Cor}$ is combined with a signal $S_{TX-Num}$ in order to generate digital signal $S_{TX-Cor-Num}$. Digital signal $S_{TX-Num}$ carries the information to be emitted, for instance from a modem.

Signal $S_{TX-Cor-Num}$ is then converted into an analog signal $S_{TX-Cor}$ by the digital/analog converter 24.

At the mixing means 23, signal $S_{TX-Cor}$ is then mixed with signal $S_{LO}$ generated by the oscillator oscillating freely in order to generate analog signal $S_{TX}$. This signal $S_{TX}$ carries the information to be emitted and presents the required frequency with a view to its subsequent emission by emission means 22. These emission means 22 may include but are not restricted to an aerial.

This conversion system that operates in emission mode relies on the same principles as the conversion system in reception mode described previously with reference to the simplified diagram in FIG. 1. In particular, generation means 1, mixing means 23 and device 10 can be similar to those of the conversion system operating in reception mode. Therefore, the previous example will be referred to for a detailed description of these components.

The conversion system operating in emission mode also presents the same advantages as the conversion system in reception mode that has been described previously.

By referring to FIG. 3, a conversion system according to the invention arranged so as to operate both in emission mode and in reception mode will now be described. This conversion system combines the characteristics of the conversion system operating in reception mode and the conversion system operating in emission mode described previously.

The conversion system includes generation means 10 for generating a sinusoidal signal $S_{LO}$, a device arranged so as to generate an error correction signal $S_{Cor}$, a reception channel 20 and an emission channel 30. Advantageously, frequency $F_{LO}$ may oscillate freely.

In this embodiment, generating means 10 include a digitally controlled oscillator (DCO).

When it operates in reception mode, this conversion system works in the same way as the conversion system operating in reception mode described previously with reference to the simplified diagram in FIG. 1.

Figure 2:
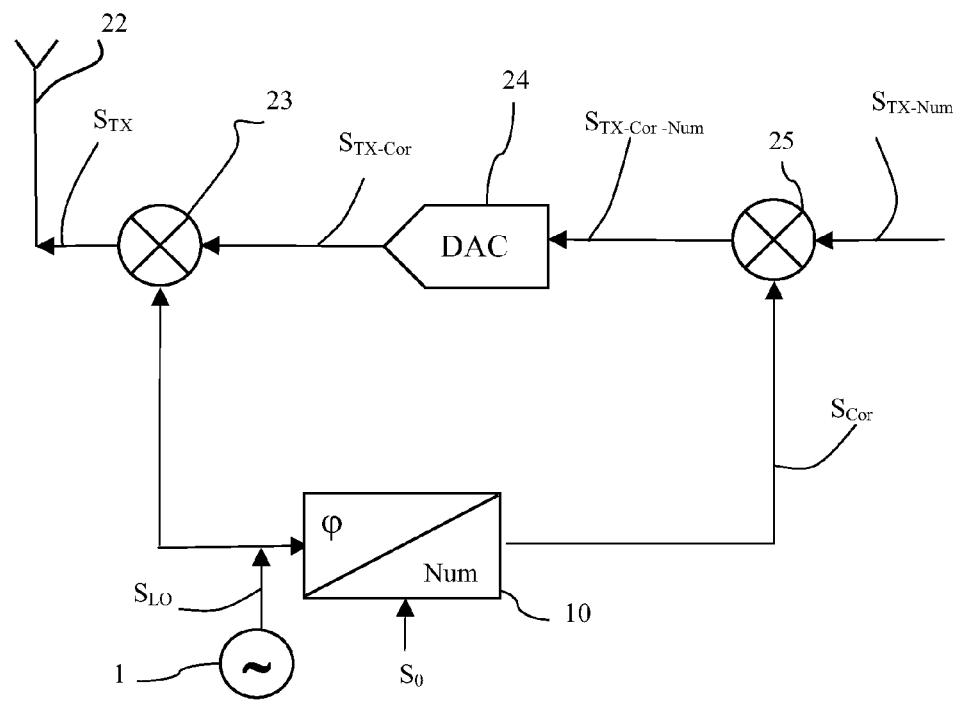
FIG. 2 is a simplified diagram of one example of the conversion system according to the invention designed to ensure the emission of a radiofrequency signal.

Similarly, when it operates in emission mode, the conversion system operates in the same way as the conversion system operating in emission mode described previously with reference to the simplified diagram in FIG. 2.

Therefore, signal $S_{LO}$ delivered by generation means 1 is injected into mixer 3 of reception channel 20, and into mixer 23 of emission channel 30 according to whether the system operates in reception mode or in emission mode. Similarly, correction signal $S_{Cor}$ generated by device 10 is injected into combination means 5 of reception channel 20 or into combination means 25 of emission channel 30 according to whether the system operates in reception mode or in emission mode.

This conversion system has the same characteristics and offers the same advantages as the conversion system operating in emission mode and as the conversion system operating in transmission mode described previously.

Moreover, the conversion system according to the invention comprises, in a preferred embodiment and for each of emission channel 20 and reception channel 30, an amplifier 6, 26 between aerial 2, 22 and mixing means 3, 23. Moreover, means 7, 27 arranged so as to amplify and filter the signal may be provided between converter 4, 24 and mixer 3, 23. The characteristics of means 7, 27 and amplifier 6, 26 will be easily determined based on the performances and application required for the conversion system.

Figure 3:
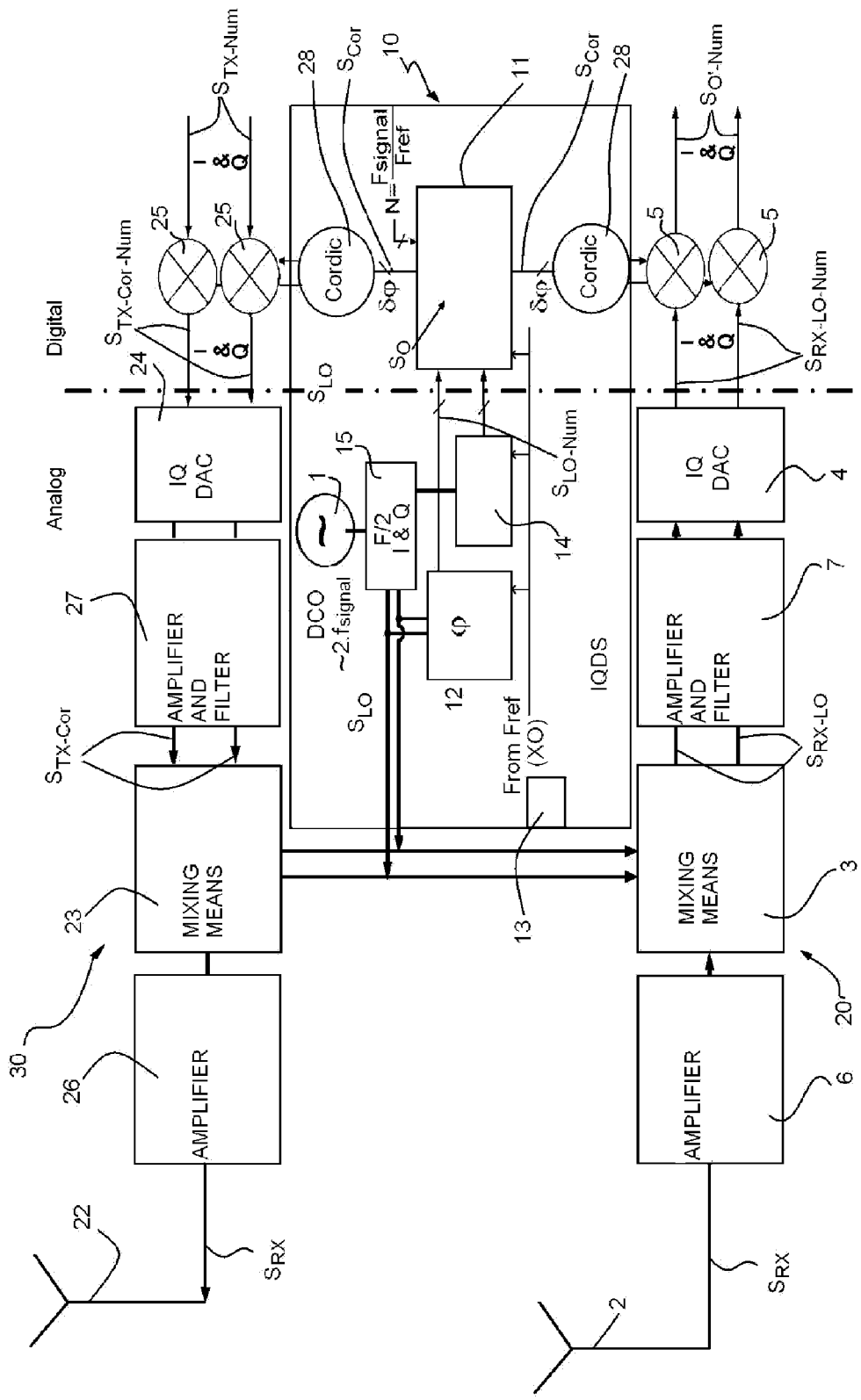
FIG. 3 is a simplified diagram of one example of the conversion system according to the invention designed to operate in emitting mode and in reception mode.

As a specialist in the field may easily determine and as indicated by FIG. 3, generation means 10 include conventional division means 15, the role of which is to divide the signal at the oscillator output into two signals I and Q in quadrature. This division into two separate signals is not shown on FIGS. 1 and 2 for reasons of clarity.

As shown on the example of the embodiment in FIG. 3, device 10 also includes:
sampling means including a phase sampler 12,
a reference 13 delivering a reference signal $S_{Ref}$,
a correction block 11.

Phase sampler 12 receives an input signal $S_{Ref}$ and at least one signal from I or Q. On each rising edge of signal $S_{Ref}$ it generates a signal $S_{LO\text{-}Num}$, the digital representation of the instantaneous phase of signal $S_{LO}$. This signal $S_{LO\text{-}Num}$ is injected into correction block 11. Advantageously, the conventional initiation means and/or calibration means such as counter 14 receiving input signal $S_{Ref}$ and at least one signal from 1 or Q enabling the conversion system to be initiated. Other known conventional initiation and/or calibration means may be envisaged for the purposes of this initiation.

In a preferred manner, correction block 11 includes correction means arranged so as to correct the imperfections of the sampling means, in particular by liberalization of signal $S_{LO\text{-}Num}$. Correction block 11 also presents two inputs on which are respectively indicated $S_{Ref}$ and ideal signal $S_0$. Correction block 11 also includes:
means for calculating the instantaneous phase gap between signal $S_{LO}$ and ideal signal $S_0$,
means for generating a digital correction signal $S_{Cor}$ reflecting this phase gap.

In a preferred embodiment, correction block 11 also includes:
means for filtering correction signal $S_{Cor}$
interface means arranged so as to vary the characteristics of ideal signal $S_0$,
interface means arranged so as to adjust the filtering characteristics applied to signal $S_{Cor}$ by allowing for example modification of the filter bandwidth.

In a particularly advantageous manner, all the functions carried out by correction block 11 are applied by the digital means.

Signal $S_{Cor}$ output from correction block 11 is then injected into the coordinate protection digital computer (CORDIC) generating two digital signals in quadrature. At the combination means 5, 5, 25, 25, these two signals are respectively multiplied to one of signals I and Q from reception channel 20 when the conversion system is operating in reception mode or injected into the emission channel 30 when the conversion system is operating in emission mode.

Thus, in a conversion system according to the invention, the analog part of the system carries out an approximate and non-consistent frequency translation. Indeed, consistent is generally applied to describe radiofrequency reception or transmission when the frequency translation is carried out by a signal from a frequency synthesizer. In the context of this invention, it is only when the signals emitted by the digital and analog parts are associated that this consistency is created thanks to the continuous control of signal $S_{LO}$ errors and correction of the effects of these errors on the signals to be received or transmitted.

The conversion system according to the invention offers performances in terms of improved purity and reliability compared to known conversion systems. Moreover, the invention improves substantially the agility of known conversion systems. In addition, the adaptation of a conversion system for a given application requires development efforts essentially in the digital field which limits the adaptation costs.

In addition, the invention makes notable reductions to the occupied silicon surface and therefore to the costs of the known conversion systems.

The present invention is not limited to the embodiments described above but covers all embodiments conforming to its spirit.

In particular, without leaving the scope of the invention, a conventional frequency synthesizer type PLL may be envisaged as the means for generating signal $S_{LO}$ in place of the free oscillator mentioned in the examples described above.

REFERENCES

1. Means for generating a sinusoidal signal
2. Reception means
22. Emission means
3. Mixing means
23. Mixing means
4. Analog/digital conversion means
24. Digital/analog conversion means
5. Combination means
25. Combination means
10. Device
6. Amplifier
26. Amplifier
7. Filtering and application means
27. Filtering and amplification means
8. CORDIC
28. CORDIC
11. Correction block
12. Phase sampler
13. Reference
14. Counter
15. Division means
20. Reception channel
30. Emission channel

The invention claimed is:

1. A system for converting a received radiofrequency signal $S_{RX}$ in order to recover encoded data carried by signal $S_{RX}$, comprising:
generating means arranged so as to generate a signal $S_{LO}$;
mixing means arranged so as to generate a signal $S_{RX\text{-}LO}$ by mixing signal $S_{RX}$ and signal $S_{LO}$;
an analog/digital converter arranged so as to convert signal $S_{RX\text{-}LO}$ into a digital signal $S_{RX\text{-}LO\text{-}Num}$;
a device generating an error correction digital signal $S_{Cor}$, the device being arranged so that digital signal $S_{Cor}$ reflects a phase gap between the phase of signal $S_{LO}$ and a phase setpoint, the phase setpoint being a phase of an ideal signal $S_0$, ideal for recovering the encoded information carried by signal $S_{Rx}$; and combination means arranged to generate signal $S_{O'-Num}$ by combining signal $S_{RX-LO-Num}$ with digital signal $S_{Cor}$.

2. A system for converting a digital signal $S_{TX-Num}$ in order to emit a radiofrequency analog signal $S_{TX}$ carrying the digital signal $S_{TX-Num}$ information, comprising:

generation means arranged so as to generate a signal $S_{LO}$;

a device generating an error correction digital signal $S_{Cor}$, the device being arranged so that digital signal $S_{Cor}$ reflects a phase gap between signal $S_{LO}$ phase and a phase setpoint, the phase setpoint being the phase of an ideal signal $S_0$, ideal for transposing signal $S_{TX-Num}$ on a frequency required for its emission;

combination means arranged to generate signal $S_{TX-Cor-Num}$ by combining $S_{TX-Num}$ with digital signal $S_{Cor}$;

a digital/analog converter arranged to convert digital signal $S_{TX-Cor-Num}$ into an analog signal $S_{TX-Cor}$; and mixing means arranged so as to generate a signal $S_{TX}$ by mixing signal $S_{TX-Cor}$ with signal $S_{LO}$.

3. The conversion system according to claim 1, further comprising:

means for generating a reference signal $S_{Ref}$; and sampling means with inputs signal $S_{LO}$ and signal $S_{Ref}$ and arranged so as to generate a digital signal $S_{LO-Num}$, the digital representation of signal $S_{LO}$.

4. The conversion system according to claim 3, wherein the sampling means include a phase sampler and that signal $S_{LO-Num}$, is a digital representation of the signal phase $S_{LO}$.

5. The conversion system according to claim 3, wherein the device includes:

at least one input arranged to receive the characteristics of ideal signal $S_0$, at least one input arranged to receive digital signal $S_{LO-Num}$, means for calculating an instantaneous phase error between signal $S_{LO}$ and signal $S_0$, and means for generating digital signal $S_{Cor}$ in the form of a reverse phase of the said phase error.

6. The conversion system according to claim 3, wherein the device includes digital filtering means arranged to filter digital signal $S_{Cor}$.

7. The conversion system according to claim 6, wherein the digital filtering means include at least one digital filter, the bandwidth of which can be adjusted.

8. The conversion system according to claim 3, wherein the device includes correction means arranged so as to correct the imperfections of the sampling means.

9. The conversion system according to claim 1, wherein the device includes interface means arranged so as to vary the characteristics of ideal signal $S_0$.

10. A system for converting a digital signal to receive and emit a radiofrequency analog signal including a system for converting a received radiofrequency signal $S_{RX}$ in order to recover encoded data carried by signal $S_{RX}$, according to claim 1 and a system for converting a digital signal $S_{TX-Num}$ in order to emit a radiofrequency analog signal $S_{TX}$ carrying the digital signal $S_{TX-Num}$ information, comprising:

generation means arranged so as to generate a signal $S_{LO}$;

a device generating an error correction digital signal $S_{Cor}$, the device being arranged so that digital signal $S_{Cor}$ reflects a phase gap between signal $S_{LO}$ phase and a phase setpoint, the phase setpoint being the phase of an ideal signal $S_0$, ideal for transposing signal $S_{TX-Num}$ on a frequency required for its emission;

combination means arranged to generate signal $S_{TX-Cor-Num}$ by combining $S_{TX-Num}$ with digital signal $S_{Cor}$;

a digital/analog converter arranged to convert digital signal $S_{TX-Cor-Num}$ into an analog signal $S_{TX-Cor}$; and mixing means arranged so as to generate a signal $S_{TX}$ by mixing signal $S_{TX-Cor}$ with signal $S_{LO}$.

11. A method for converting a received radiofrequency signal $S_{RX}$ in order to recover encoded information carried by signal $S_{RX}$, comprising:

generating a signal $S_{LO}$;

generating a signal $S_{RX-LO}$ by mixing signal $S_{Rx}$ with signal $S_{LO}$;

converting signal $S_{RX-LO}$ into a digital signal $S_{RX-LO-Num}$;

generating a digital error correction signal $S_{Cor}$, reflecting a phase gap between signal $S_{LO}$ phase and a phase setpoint, the phase setpoint being the phase of an ideal signal $S_0$, ideal for recovery of the encoded information carried by signal $S_{RX}$; and generating a signal $S_{O'-Num}$ by combining signal $S_{RX-LO-Num}$ with digital signal $S_{Cor}$.

12. A method for converting a digital signal $S_{TX-Num}$ in order to emit a radiofrequency analog signal $S_{TX}$ carrying signal $S_{TX-Num}$ information, comprising:

generating a signal $S_{LO}$;

generating a digital error correction signal $S_{Cor}$ reflecting a phase gap between signal $S_{LO}$ phase and a phase setpoint, the phase setpoint being the phase of an ideal signal $S_0$, ideal for transposing signal $S_{TX-Num}$, at a frequency required for its emission;

generating a digital signal $S_{TX-Cor-Num}$ by combining signal $S_{TX-Num}$ with correction signal $S_{Cor}$;

converting signal $S_{TX-Cor-Num}$ into an analog signal $S_{TX-Cor}$; and generating signal $S_{TX}$ by mixing signal $S_{TX-Cor}$ with signal $S_{LO}$.

13. The conversion system according to claim 2, further comprising:

means for generating a reference signal $S_{Ref}$; and sampling means with inputs signal $S_{LO}$ and signal $S_{Ref}$ and arranged so as to generate a digital signal $S_{LO-Num}$, the digital representation of signal $S_{LO}$.

14. The conversion system according to claim 13, wherein the sampling means include a phase sampler and that signal $S_{LO-Num}$, is a digital representation of the signal phase $S_{LO}$.

15. The conversion system according to claim 13, wherein the device includes:

at least one input arranged to receive the characteristics of ideal signal $S_0$, at least one input arranged to receive digital signal $S_{LO-Num}$, means for calculating an instantaneous phase error between signal $S_{LO}$ and signal $S_0$, and means for generating digital signal $S_{Cor}$ in the form of a reverse phase of the said phase error.

16. The conversion system according to claim 13, wherein the device includes the filtering means arranged to filter digital signal $S_{Cor}$.

17. The conversion system according to claim 16, wherein the digital filtering means include at least one digital filter, the bandwidth of which can be adjusted.

18. The conversion system according to claim 13, wherein the device includes correction means arranged so as to correct the imperfections of the sampling means.

19. The conversion system according to claim 2, wherein the device includes interface means arranged so as to vary the characteristics of ideal signal $S_0$.

* * * * *